United States Patent [19]

Hums et al.

[11] 4,115,140

[45] Sep. 19, 1978

[54] LIME SILICIC ACID MIXTURES AND METHODS OF MAKING BUILDING MATERIALS THEREFROM

[75] Inventors: Dieter Hums, Schrobenhausen; Friedrich Hergeth; Werner Wetzig, both of Messel, all of Germany

[73] Assignee: Intong AB, Fack, Sweden

[21] Appl. No.: 759,731

[22] Filed: Jan. 17, 1977

[30] Foreign Application Priority Data

Jan. 17, 1976 [DE] Fed. Rep. of Germany ....... 2601683

[51] Int. Cl.$^2$ ................................................. C04B 7/34
[52] U.S. Cl. .................................. 106/120; 106/40 R; 106/69; 106/73.1; 106/86; 106/98; 106/122
[58] Field of Search ....................... 106/40 R, 69, 73.1, 106/86, 87, 98, 120, 122, 286; 252/62; 423/331

[56] References Cited

U.S. PATENT DOCUMENTS

| | | |
|---|---|---|
| 2,803,556 | 8/1957 | Carlsson et al. ....................... 106/87 |
| 3,331,731 | 7/1967 | Bääk ..................................... 106/73.1 |
| 3,652,310 | 3/1972 | Kraemer et al. ...................... 106/120 |
| 3,988,402 | 10/1976 | Ueda et al. ............................. 106/86 |

*Primary Examiner*—Lorenzo B. Hayes
*Assistant Examiner*—W. Thompson
*Attorney, Agent, or Firm*—Larson, Taylor and Hinds

[57] ABSTRACT

Improved building compositions are prepared by including in CaO-containing components/SiO$_2$-containing components admixtures a small amount of chemically precipitates silicic acid containing flourine as an impurity.

A steam-cured building material preferably prepared by first pre-grinding sand with the chemically precipitated silicic acid and water, storing the resulting slurry for at least 0.5 hour and then mixing it with the CaO-containing component. The wet grinding and storing steps have been found to have a surprisingly favorable effect on the viscosity of the pumpable sand slurry and on the behavior of the risen mixture at the cutting.

7 Claims, No Drawings

LIME SILICIC ACID MIXTURES AND METHODS OF MAKING BUILDING MATERIALS THEREFROM

BACKGROUND OF THE INVENTION

This invention relates to compositions for the production of building materials, particularly steam-cured building materials, and to methods of manufacturing such building materials.

To make steam-cured building materials usually mixtures of raw materials which contain silicic acid, such as for instance sand or slag, and calcareous binding agents, such as quick lime and/or cement are used, the height ratio of $SiO_2$ containing components generally being between 90 to 10 and 65 to 35, preferably 80 to 20. After a forming process, these mixtures are cured in autoclaves with steam at elevated pressure and elevated temperature, respectively. Under these conditions, the silicic acid and the binding agents, especially the CaO-components of the binding agents dissolve and react while calcium hydro-silicates (CSH-phases) form. The latter act as binding agents in the steam-cured building material and provides the material its mechanical strength.

To increase reactivity during the autoclave treatment, not just the binding agents but also the siliceous components in the initial mixtures for the steam-cured building materials are finely ground. For instance, sand which is used for making gas concrete is thus ground to less 100 $\mu$m. Any further comminution is economically prohibitive, and besides, the degree of fineness is limited due to the grinding means in use.

In gas concrete mixtures attempts have been made to use reactive silicic acids which are very fine to begin with. However, natural and industrial products of that kind are very expensive and not sufficiently uniform in their composition. Furthermore, they are generally not available in an acceptable quality containing too many components which render them unsuitable for the autoclave process.

Another disadvantage is that the fine silicic acid binds water. Thus, the viscosity of a water-containing mixture increases so strongly that, for instance, pumpability is reduced and the rising process of a gas concrete mixture may be incomplete. The stiffened mass gets too brittle and cannot be cut by conventional wire saws.

The object of the invention is therefore to create a mixture of lime and silicic acid components as well as a method, suitable for making building material, particularly for making steam-cured building materials, using finely divided silicic acids but without the aforementioned disadvantages.

SUMMARY OF THE INVENTION

The invention relates to an improvement in building material compositions comprising at least one CaO-containing component and at least one $SiO_2$-containing component, the ratio of $SiO_2$ to CaO components being about 90 to 10 and 65 to 35, expanding agents and water, the improvement comprising including in the composition about 0.5 to 10% by weight preferably about 0.5 to 6% by weight, based on the quantity of solid substances, of a silicic acid additive comprising chemically precipitated silicic acid containing flourine as an impurity.

In accordance with the method of the invention, steam-cured building materials, preferably gas concrete, is prepared by first pre-grinding sand of grain size 0-10mm preferably 0-3mm with the chemically precipitated silicic acid additive and water in a weight ratio of sand, silica acid, water of 100: 0.7: 34 to 100: 8: 36 for about one to two hours. Customarily used sand has a grain size 60-100% less 100 $\mu$m, preferably 75-95% less 90 $\mu$m. The resulting slurry is then stored for at least 0.5 hour up to 24 hours and then mixed with at least one CaO-containing component in a weight ratio of stored slurry to CaO component between 90 to 10 and 65 to 35 for 1-3 minutes while adding effective amounts of one or more expanding agents such as aluminum powder. The resulting mass is then poured into molds and allowed to rise, usually for at least 3 up to 30 minutes, cut while still wet and steam-cured in an autoclave using conventional steam-curing elevated temperatures and pressures.

The wet grinding and storing steps of the method of the invention especially have been found to have a surprisingly favorable effect on the viscosity of pumpable sand slurry and on the behavior of the risen mixture at the cutting. It is also advantegeous if a standing time of about 0–8 hours, preferably 1.5–3 hours is allowed after the rising process.

It is also possible, according to the present invention, to abandon the wet pre-grinding of sand and silicic acid together, and to put the chemically precipitated silicic acid with a lime, water and expanding agent directly into the mixer.

DETAILED DESCRIPTION OF THE INVENTION

It is particularly advantageous if the silicic acid additive also contains alkalis in trace amounts up to 2.0% by weight, preferably from 0.01 to 1.0% by weight, and aluminium oxide in quantities of 1.0 to 4.0% by weight, preferably 2 to 3% by weight, as well as water in quantities of 30 to 70% by weight, preferably 40 to 60% by weight.

The following mixture is an example of a peferred chemically precipitated silicic acid containing hydrated $AlF_3$ as the fluorine component which has been found to be especially useful in the present invention:

| | | | |
|---|---|---|---|
| 85 | — | 96 | % by weight of $SiO_2$ |
| 1 | — | 4 | % by weight of $Al_2O_3$ |
| Traces | — | 1 | % by weight of alkalis |
| 1 | — | 8 | % by weight of $AlF_3$ aq |
| 2 | — | 8 | % by weight loss on ignition |

More preferable yet is a silicic acid containing:

| | | | |
|---|---|---|---|
| 91 | — | 93 | % by weight of $SiO_2$ |
| 1 | — | 3 | % by weight of $Al_2O_3$ |
| 0.01 | — | 0.2 | % by weight of alkalis |
| 2 | — | 4 | % by weight of $AlF_3$.aq |
| 4 | — | 6 | % by weight loss on ignition |

The fluorine-containing silicic acid additives of the invention may be obtained for instance, as a precipitated by-product in fluorine production and is presently discarded as a waste product. Since the material dries out very slowly, it remains a slurry for a long period of time and consequently represents a latent environmental danger. The preferred silicic additive of the invention is the well known chemically precipitated waste product which appears when other fluorine compounds such as for instance aluminium fluoride are produced from fluosilicic acid. The precipitated silicic acid is dried on drum filter to a water content of approx. 50% by weight. The silicic acid has a specific surface measured in accordance with BET, (Brunauer - Emmet - Teller) of 2 to 15 m2/g, preferably 5 to 10 m2/g, and is X-ray amorphous. For production reasons, it usually also contains water, and is therefore easy to transport and to process, especially when using burnt lime as the CaO-component in the mixture as per the invention, since the slaking process and the viscosity of a water-containing mixture will be more favourable through the water content of the silicic acid.

The amount of the silicic acid additive in the improved building material compositions of the invention is 0.1–10% by weight, preferably 0.5–6% by weight, based on the total quantity of solid substances in the composition.

Gas concrete stones produced by the method of the invention have about 10–30% higher strengths than materials produced without the fluorine-containing silicic acid. The usual raw materials in the mixtures as per the invention have unaltered proportions. If the portion of binding agent is increased, i.e. for instance the portion of burnt lime or hydrate-lime, an even higher increase of the strength can be achieved through the addition of the silicic acid additive whereas without the addition of the silicic acid additive the strength decreases considerably even if the portion of binding agents is slightly increased (over-liming).

The successful utilization of chemically precipitated fluorine-containing, silicic acid especially from the hydrofluoric acid production was not at all expected. The principal reason against use of such materials was their composition, i.e. the fluorine-containing compounds and other impurities in the silicic acid. The risk of fluorine being set free under the autoclave conditions had to be considered and is was expected that the the autoclave walls and the reinforcements in the building material which are in the autoclave for curing would be corroded. Surprisingly enough no noteworthy concentrations of fluorine can be observed in the waste steam, autoclave condensate or in the steam-cured building materials. There was also a risk of considerable increases in the viscosity of the sand slurry as a consequence of the high specific surface of the silicic acid, and that the slurry would lose its pumpability. However, it was verified that the viscosity increases somewhat immediately after the mixing or the grinding together of sand slurry and silicic acid, but that the viscosity decreases again after the storage time and reaches even lower values than without the addition of the silicic acid additive. Thus, even slurries with a higher content of solid substances can be treated.

Another surprising effect is that the silicic acid additive does not as might be expected, extract water out of the rising mass, causing a higher viscosity during the rising process. This process remained uneffected, and the result was still a stronger drying out effect on the mass. The drying out was, however, not unfavourable, as the mass showed a thixotrop behaviour and could be cut with even sharper edges, which resulted in a cutting view in accordance with the pore structure, i.e., not smeared. This means that particularly precision blocks with exact and sharp profiles can be manufactured.

The synergistic effect of the chemically precipitated silicic acid additive, particularly the fluorine-containing silicic acid which appears at the fluorine production, on the viscosity and the strength of the steam-cured products, is also supplemented by the particularly favourable influence on shrinkage during drying. It was verified that products which were made of the mixtures as per the invention have less shrinkage than products produced in the conventional way. This effect of the precipitated silicic acid was also surprising, as the shrinkage tendency grows when the degree of fineness of the siliceous components in a gas concrete mixture is increased.

EXAMPLE

For the production of gas concrete, 100 tons raw sand of grain size 0–5 mm and 10 tons chemically precipitated water-containing silicic acid from fluorine production and 33 tons water were put in a continuously working wet grinding mill and this mixture was ground. The resulting sand slurry was stored for several hours in the stirrer silo. One charge of the sand slurry was then mixed with 500 kg binding agent, consisting of quicklime and cement and 2 kg expanding agent (aluminium powder) in a high speed mixer for 2 minutes. After being poured into a mould, the mass rose for 5 to 10 minutes, stiffened and was stored for 2.5 hours. After that, the mass was cut and cured at 12 kp/cm2 in the autoclave for about 6 hours. In comparison with conventional gas concrete stones which were produced with the same lime content and sand, the strength increased from 25 kp/cm2 to 31 kp/cm2 dry volume weight of 0.47 kg/dm3.

As the norms valid for gas concrete G 25 (German norms) stipulate a compression strength of 25 kp/cm2, there is a possibliity of decreasing the dry volume weight. The dry volume weight in the production was decreased from 0.49 kg/dm3 to 0.42 kg/dm3, which led to considerable savings in material. At the same time the heat transmission figure went down from 0.098 to 0.083 kcal/m h ° C. for the lighter product.

It is claimed:

1. In a cellular concrete manufactured from a mixture comprising water, at least one $SiO_2$-containing component as a base material, at least one CaO-containing component as a binding agent, and small quantities of an expanding agent for providing pores in a mass formed when said water, said $SiO_2$-containing and CaO-containing components are mixed together, the weight ratio of $SiO_2$-components to CaO-components being between 90 to 10 and 65 to 35, said mass being steam-cured at elevated temperature and pressure in order to grant final strength to the cellular concrete, the improvement comprising including in said mixture about 0.5 to 10% by weight, based on the total weight of said substances, a silicic acid additive comprising chemically precipitated silicic acid containing about 1 to 8% by weight, hydrated $AlF_3$ as an impurity.

2. The steam-cured building material of claim 1 wherein the additive includes traces amounts up to 2% by weight of alkalis.

3. The steam-cured building material of claim 2 wherein the additive includes about 1 to 4% by weight aluminum oxide.

4. The steam-cured building material of claim 3 wherein the additive included about 30 to 70% water.

5. The steam-cured building material of claim 1 wherein the additive is present in an amount of about 2 to 4% by weight.

6. The steam-cured building material of claim 1 wherein the additive comprises about 85 to 90% by weight chemically preceiptated silicic acid about 1 to 4% by weight $Al_2O_3$ about 1 to 8% by weight hydrated $AlF_3$ and trace amount up to 1% by weight alkalis.

7. The steam-cured building material of claim 1 wherein the silicic acid additive has a specific surface of 2 to 15m2/g and is X-ray amorphous.

* * * * *